United States Patent Office 3,514,579
Patented May 26, 1970

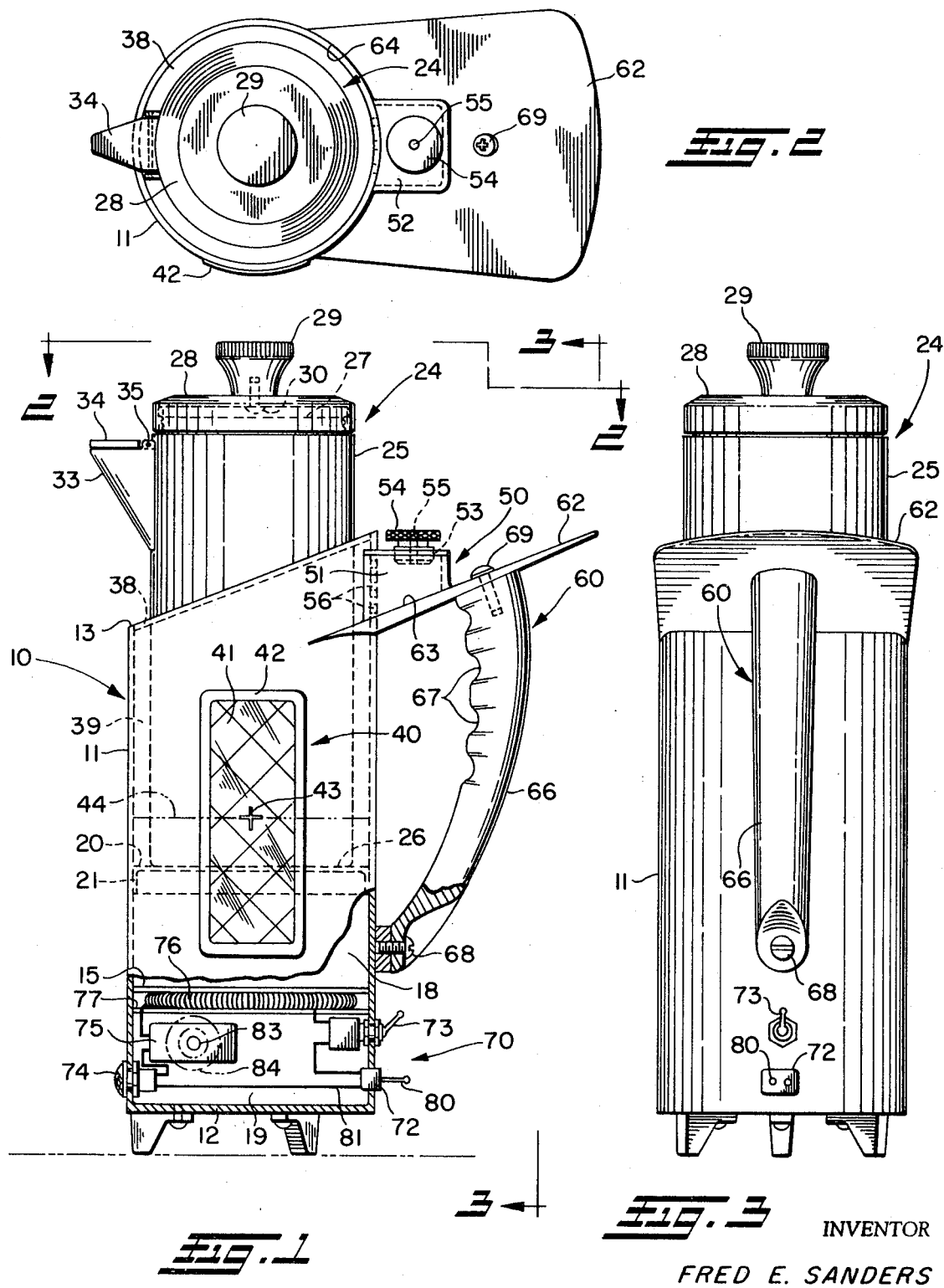

3,514,579
ELECTRIC SYRUP WARMER
Fred E. Sanders, 503 E. 108th St.,
Cleveland, Ohio 44108
Filed July 23, 1968, Ser. No. 746,886
Int. Cl. F27d *11/02*
U.S. Cl. 219—430                                4 Claims

ABSTRACT OF THE DISCLOSURE

An electrically operated appliance for the warming of waffle or pancake syrup and the like consisting of a unitary jacketed syrup container, the jacketed portion providing a steam chamber for heating the syrup. An integral resistance heater and thermostat control the water temperature and generation of steam and a novel handle shield and filling spout configuration provide protection for lifting of the appliance.

This invention relates to electric appliances and more particularly to a syrup warmer which provides a form of apparatus for heating or maintaining syrup at a temperature level above ambient room temperature for improved fluid flow and better taste quality in a container convenient for storage or for cleaning.

It is well known that the taste of pancakes is improved measurably when heated syrup is used. An elevated syrup temperature provides a more viscous fluid which allows greater penetration into the surface of the food whether it be pancakes, waffles, toast or other similar foods. Syrup is commonly stored at room temperature or in a refrigerated state and this invention provides a convenient means for elevating the temperature of the syrup in a quick and efficient manner while preventing burning and sticking of same. Further, especially in commercial establishments where large quantities of pancakes and the like are prepared, the application of warmed syrup aids in providing a warmed food preparation.

Therefore, it is an object of the invention to provide a syrup warming appliance which may utilize either a steam or hot water mode of heating of the syrup.

It is another object of the invention to provide an improved electric syrup warmer of a unitary jacketed construction in which both the syrup and the heating medium can be readily introduced and removed and which is convenient for cleaning.

It is still another object of the invention to provide an electric syrup warmer which utilizes a steam chamber and novel water spout and handle shield construction which in combination provide a water vapor safety vent and splash shield.

It is yet another object of the invention to provide a water tight electric syrup warmer which includes an integral heating unit which is presettable to a desired temperature level and which may be immersed together with the syrup container for cleaning purposes.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

In said annexed drawing:

FIGS. 1, 2 and 3 are respectively elevational, plan and handle-side views of the electric syrup warmer, partly cut away to show details of the electric heating portion and handle construction.

Referring now to FIG. 1, the syrup warmer 10 comprises an outer container 11 of hollow cylindrical configuration, preferably of thin gauge aluminum, having an integral bottom wall 12 and an open upper end 13, the latter being angled upwardly from front to back or from left to right as viewed in FIG. 1 for purposes to be described in more detail hereinafter. A bottom plate 15 consisting of a circular sheet of aluminum or other heat transmitting material is welded in place near the bottom of the container 11 to form a water tight upper chamber 18 for receipt of fluid to be heated and a bottom chamber 19 for the electrical heating components.

A circular piece 20 of aluminum having a depending flange 21 is welded in place in the upper chamber 18 approximately one third the distance between the bottom plate 15 and the upper end 13 thereof to provide a support for the syrup container. This support piece 20 may be of any configuration and is either of porous material or is made penetrable by a plurality of holes over its area for flow of water or steam therethrough. Alternatively, such support piece 20 may take the form of a ring for supporting the lower end of the syrup container 24 or may be a plurality of webs for supporting the container 24 at several points.

The syrup container 24 is a cylindrical can 25 having a closed bottom wall 26 and an open upper end 27, again preferably made of aluminum but conveniently of any conventional heat transmitting material. The upper end 27 is threaded and a threaded cover 28 is shown in this embodiment of the invention for closing the upper end of the syrup container 24 with the aid of a heat insulative knob 29 secured thereto by a screw 30. However, such end 27 and closure piece 28 may be of any other convenient construction such as a slidingly engageable lid which serves to retain the syrup vapors within the container 24. A spout 33 is provided on the forward and upper portion of the syrup container 24, communicating with the interior thereof by means of apertures (not shown) in the can 25, for the pouring of syrup from the container. Such spout 33 includes a lid 34 hinged in place on pin 35, the lid 34 being closed by gravity in the normal resting position to aid in the retention of vapors within the container 24 during heating and to act as a seal for storage of syrup therein.

In this embodiment of the invention the upper end 13 of the outer container 11 is closed with a ring 38 of aluminum or other compatible material for providing a secure fit between the inner and outer containers. Preferably the ring 38 is welded in place on both the inner and outer periphery to the syrup container 24 and the water container 11, respectively. The syrup container 24 is similarly welded in place at its bottom 26 to the support piece 20 or other alternative support, to secure the containers together.

Alternatively, the ring 38 may be flanged at its inner periphery adjacent the syrup container 24, to provide a slidable fit for the syrup container and to provide an effective seal against the loss of excessive water or vapor. In this alternative embodiment the bottom wall 26 of the syrup container 24 may rest upon the support piece 20 and several flange pieces (not shown) may be used to prevent sideways movement of the container 24 while allowing removal of same. It is apparent also that although a cylindrical configuration is shown for the containers 11, 24 in this embodiment, containers of square or any other cross section may be utilized as well, having regard only for the necessity of having a correspondingly shaped ring 38 and the like, it being obvious, however, that the cylindrical shape is more suitable for cleaning purposes and ease of fabrication.

This construction of the containers 11, 24 effects a steam enclosure or chamber 39, between the containers, which surrounds the lower potrion of the syrup container 24, being vertically defined by the ring 38 and the surface of the water in the outer container 11. In the cylindrical can 25 configuration, such enclosure 39 is an annular area forming a jacket about the periphery of the syrup container 24.

As seen in FIG. 1, a window 40 is utilized for providig an indication of the water level within the outer container 11, such window 40 comprising a piece of heat resistant glass 41 shaped to conform to the outer periphery of the water container 11 and closing an aperture therein. The glass 41 is retained in place by a bezel 42 of corresponding rectangular shape welded to the outer surface of the container 11. Heat and water resistant cement could be used alternatively for retaining the window 41 in place, the only requirement being that a water secure arrangement is effected.

As noted in FIG. 1, a cross 43 is etched or marked on the glass of the window 41 at the desired water level indicated by line 44, which in this showing is high enough in elevation to cover the bottom portion of the syrup container 24. It is obvious, therefore, that direct hot water heating may be employed for elevating the temperature of the syrup within the container 24 or a combination of direct water heat and steam vapor can be realized at this water level. Similarly, if the water level is restricted to an elevation below the bottom wall 26 of the syrup container 24, direct water contact may be avoided and steam may be employed solely in the enclosure 39 between the containers 11, 24 generated from the boiling of the water in the outer container 11. The apertured construction of the support plate 20 allows the steam to fairly evenly contact the bottom 26 of the syrup container 24 as well as to completely surround its periphery.

A filling spout 50 is located at the upper rear portion of the outer container 11 and consists of a rectangular housing 51 welded to the outer container 11. A generally rectangular plate 52 welded in place to the outer container 11 and to the housing 51 in a water tight manner forms the top and side surfaces of the spout enclosure. A hole 53 threaded in the top plate 52 receives a threaded plug 54 which may be screwed in sufficiently to provide sealing engagement. The plug 54 includes a central bore 55 to provide communication between the spout enclosure and the atmosphere to allow the release of steam, the bore 55 being of small diameter to provide some restriction for the escape of steam. Communication from the area between the containers 11, 24 to the spout 50 is provided by a plurality of apertures 56 in the outer container 11 which allow the filling and emptying of the outer container with the water heating medium, via the spout 50.

The angled top configuration provides a preferred form of structure for the outer container 11 whereby water vapors in the form of steam are directed upwardly and rearwardly toward the filling spout 50 and the exhaust port 55 in the water plug 54. Such structure aids in the circulation of steam in the enclosure 39, evenly distributing the heated vapors and tending to avoid the direct flow of steam from the water surface to the spout 50. The sloped configuration further prevents water condensation and the like from flowing toward the handle area 60 as such condensates will be directed toward the forward portion of the appliance 10 under the influence of gravity.

The structure of filling spout 50 is completed by a plate 62 welded to the outer container 11 and the rectangular housing 51 in a water tight manner forming the bottom surface 63 of the filling spout 50. The plate 62 preferably is of aluminum and takes the configuration of a fan shaped blade, having an arcuate edge 64 conforming to the periphery of the container 11 and upwardly angled from the rear of the appliance forming a splash plate so that liquids flow downwardly thereon. A handle 66 of Bakelite or other insulative material of generally arcuate configuration having notches 67 on the interior side as finger indentations, is connected to the outer container 11 and the plate 62 by screws 68, 69, respectively.

The splash plate 62, therefore, serves the purposes of forming the bottom surface of the filling spout 50, supporting the handle 66 and, due to its angled relation with respect to the appliance, directing condensed steam and water splashings away from the handle area 60. It will be apparent that many different variations are possible in the handle 66 and splash plate 62 configuration, the uniqueness residing in the protection afforded in the handle area 60 disposed beneath the splash plate.

In the bottom chamber 19 of the container and sealed from the water chamber 18 by means of the bottom plate 15, is the electrical heating unit 70 for regulating water or steam temperature within the appliance. Mounted about the periphery of the outer container 11 by means of water tight fittings are the power input connector 72, the power switch 73, indicator light 74 and a thermostat 75. A heating element 76 which may be of the conventional resistance heating type is mounted in close association with the bottom wall 15 of the water chamber 18 on a support plate 77. It is clear that the bottom chamber 19 is completely isolated from the water chamber 18 and additionally may be immersed in water for cleaning purposes, by virtue of the water tight fittings.

Power for the appliance is received from the conventional household lines supplying a nominal 120 volt 60 cycle voltage by means of a removable power cord and female connector (not shown). The male connector 72, mounted in the container 11 receives power on two prongs 80 and delivers same to the series circuit consisting of the power switch 73, the resistance heating element 76, the thermostat 75 and the indicator light 74 by way of connecting wires 81.

The thermostat 75 may be of the conventional bimetal type, being variably presettable to a desired temperature by means of a knob 83 rotatable to various positions with respect to an indicia dial 84. The thermostat 75 comprises an electrical contact which is closed as long as the sensed temperature is below that preset at the dial 84 and which opens at temperature levels above this setting. Although the thermostat 75 is shown generally in the area of the heating element 76, it is clear that the sensing portion of the thermostat 75 may be located in close association with the bottom wall 15 of the container 11 or in the upper chamber 18 itself by means of fluid tight fittings, all of which is well understood in this art. The indicator light 74 being in series connection with the thermostat 75 provides an indication of when the heating element 76 is receiving power and will be unlit when the desired temperature is attained.

In an alternative embodiment of this invention (not shown), it is apparent that the bottom wall 15 of the upper chamber 18 could form the bottom of the appliance such that the heating unit 70 is separable. In this manner the appliance could be placed in position on a conventional hot plate or gas burner for elevating the temperature of the water, it being clear, however, in this mode, that temperature control, if any, would be dependent upon the characteristics of the heater. The unitary construction shown in the FIGS. 1–3 embodiment is preferable in completely enclosing the heating unit 70 and providing a measure of safety. Further, little contamination of the heating element 76 and associated components is possible in this configuration resulting in a more dependable appliance.

Other modes of applying the principles of the invention may be employed, change being made as regards the details described, provided the features stated in any of the following claims or the equivalent of such be employed.

I, therefore, particularly point out and distinctly claim as my invention:

1. A syrup warming utensil comprising a first cylindrical container for receipt of water to be elevated in temperature, a second cylindrical container for the syrup disposed within said first container to form an annular chamber about said second container, means for supporting said second container within said first container comprising a plate forming the top surface of said first container and having an aperture therein for slidably receiving said second container, said plate thereby forming the top boundary of the annular chamber, a shield plate mounted externally of said first container, a handle for lifting the utensil mounted on said first container beneath said shield plate, a spout mounted in engagement with said first container above said shield plate, said spout communicating with the annular chamber through apertures in said first container, whereby water may be introduced into said first container and water vapors may be vented from the annular chamber, a water-tight chamber at the lower portion of said first container, means for supporting said second container above said lower chamber, and means disposed in said lower chamber for elevating the temperature of water in said first container, said latter means comprising an electrical resistance heater and thermostat combination adapted for energization from a source of electrical power.

2. The utensil as set forth in claim 1 wherein said top plate is angled from the horizontal to direct water vapor to an upper portion of the peripheral chamber, said spout being mounted adjacent such upper portion.

3. The utensil as set forth in claim 2 wherein said shield plate is angularly mounted to direct water away from said handle, said handle being mounted at one end of said shield plate for support thereof and at the other to said first container.

4. The utensil as set forth in claim 3 wherein said spout is contiguous with said shield plate, the latter forming the bottom surface of said spout and adapted to direct water into the peripheral chamber.

References Cited

UNITED STATES PATENTS

| | | | |
|---|---|---|---|
| 1,091,774 | 3/1914 | Shoenberg | 219—437 X |
| 1,860,302 | 3/1932 | Thomas | 165—63 |
| 1,977,482 | 10/1934 | Klause | 219—430 |
| 2,269,874 | 1/1942 | Henschel | 219—521 X |
| 2,277,605 | 3/1942 | Palitzsch | 219—439 |
| 2,528,191 | 10/1950 | Turner | 219—437 X |
| 2,700,097 | 1/1955 | Morey | 219—433 |
| 3,247,360 | 4/1966 | Ponder | 219—436 |

VOLODYMYR R. MAYEWSKY, Primary Examiner

U.S. Cl. X.R.

126—377; 219—433, 439